(12) United States Patent
Lai et al.

(10) Patent No.: US 10,707,964 B2
(45) Date of Patent: Jul. 7, 2020

(54) OPTICAL TRANSCEIVER AND HOUSING THEREOF

(71) Applicant: Prime World International Holdings Ltd., New Taipei (TW)

(72) Inventors: Ming-You Lai, New Taipei (TW); Chien-Te Lin, New Taipei (TW); Ming-Hsing Chung, New Taipei (TW)

(73) Assignee: Prime World International Holdings Ltd., New Taipei (TW)

( * ) Notice: Subject to any disclaimer, the term of this patent is extended or adjusted under 35 U.S.C. 154(b) by 0 days.

(21) Appl. No.: 16/150,829

(22) Filed: Oct. 3, 2018

(65) Prior Publication Data

US 2020/0112373 A1 Apr. 9, 2020

(51) Int. Cl.
*H04B 10/40* (2013.01)
*G02B 6/42* (2006.01)

(52) U.S. Cl.
CPC .......... *H04B 10/40* (2013.01); *G02B 6/4256* (2013.01)

(58) Field of Classification Search
None
See application file for complete search history.

(56) References Cited

U.S. PATENT DOCUMENTS

| 6,788,540 B2* | 9/2004 | Kruger | G02B 6/4201 361/719 |
| 2005/0046011 A1* | 3/2005 | Chen | H05K 1/0274 257/705 |
| 2005/0094686 A1* | 5/2005 | Aoki | G02B 6/4201 372/35 |
| 2007/0268587 A1* | 11/2007 | Ninomiya | G02B 1/105 359/601 |
| 2009/0249849 A1* | 10/2009 | Martin | B21B 37/28 72/9.1 |

FOREIGN PATENT DOCUMENTS

JP 2008090091 A * 4/2008
TW M524593 U * 6/2016 ............ G02B 6/42

* cited by examiner

*Primary Examiner* — David W Lambert
(74) *Attorney, Agent, or Firm* — Grossman Tucker Perreault Pfleger, PLLC

(57) ABSTRACT

An optical transceiver includes a housing and an optical transceiving module. The housing includes a main body and a heat conductive component. The heat conductive component is disposed on the main body, and a thermal conductivity of the heat conductive component is larger than a thermal conductivity of the main body. The optical transceiving module is disposed in an accommodation space of the main body of the housing.

20 Claims, 5 Drawing Sheets

OPTICAL TRANSCEIVER AND HOUSING THEREOF

TECHNICAL FIELD

The present disclosure relates to an optical transceiver, more particularly, to an optical transceiver including a heat conductive component.

BACKGROUND

Optical transceivers are generally installed in electronic communication facilities in modern high-speed communication networks. In order to make flexible the design of an electronic communication facility and less burdensome the maintenance of the same, an optical transceiver is inserted into a corresponding cage that is disposed in the communication facility in a pluggable manner. In order to define the electrical-to-mechanical interface of the optical transceiver and the corresponding cage, different specifications have been provided such as XFP (10 Gigabit Small Form Factor Pluggable) used in 10 GB/s communication rate and QSFP (Quad Small Form-factor Pluggable).

With the development of technology, a high-speed optical transceiver, such as 2×100G, has been utilized to meet the demand of higher communication speed. The high-speed communication of the optical transceiver usually comes with increased heat generated by the optical transceiver.

SUMMARY

According to one aspect of the present disclosure, an optical transceiver includes a housing and an optical transceiving module. The housing includes a main body and a heat conductive component. The heat conductive component is disposed on the main body, and a thermal conductivity of the heat conductive component is larger than a thermal conductivity of the main body. The optical transceiving module is disposed in an accommodation space of the main body of the housing.

According to another aspect of the present disclosure, a housing of an optical transceiver includes a main body and a heat conductive component. The main body is configured to accommodate an optical transceiving module. The heat conductive component is disposed on the main body, and a thermal conductivity of the heat conductive component is larger than a thermal conductivity of the main body.

BRIEF DESCRIPTION OF THE DRAWINGS

The present disclosure will become more fully understood from the detailed description given below and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
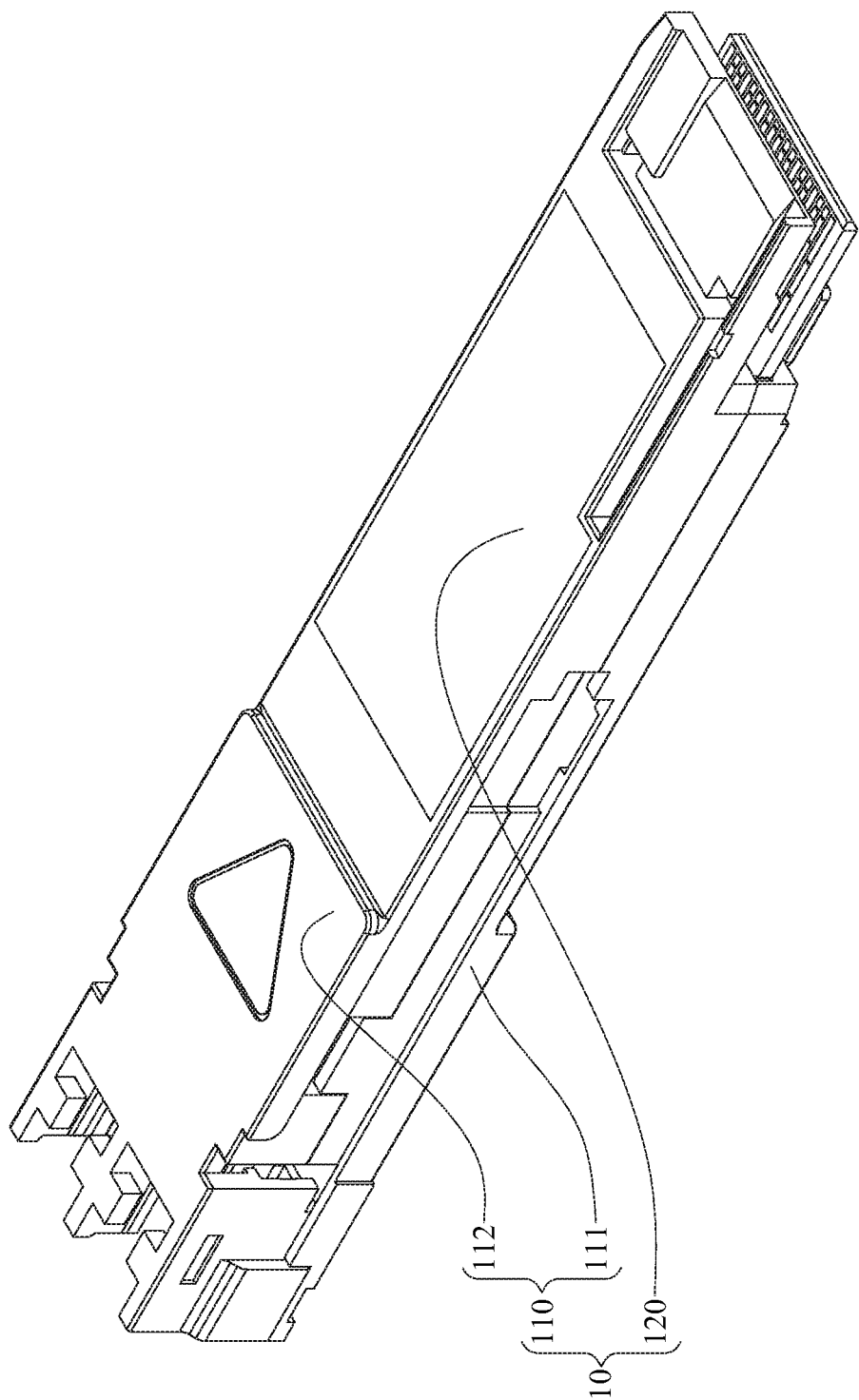
FIG. 1 is a perspective view of an optical transceiver according to a first embodiment of the present disclosure.
Figure 2:
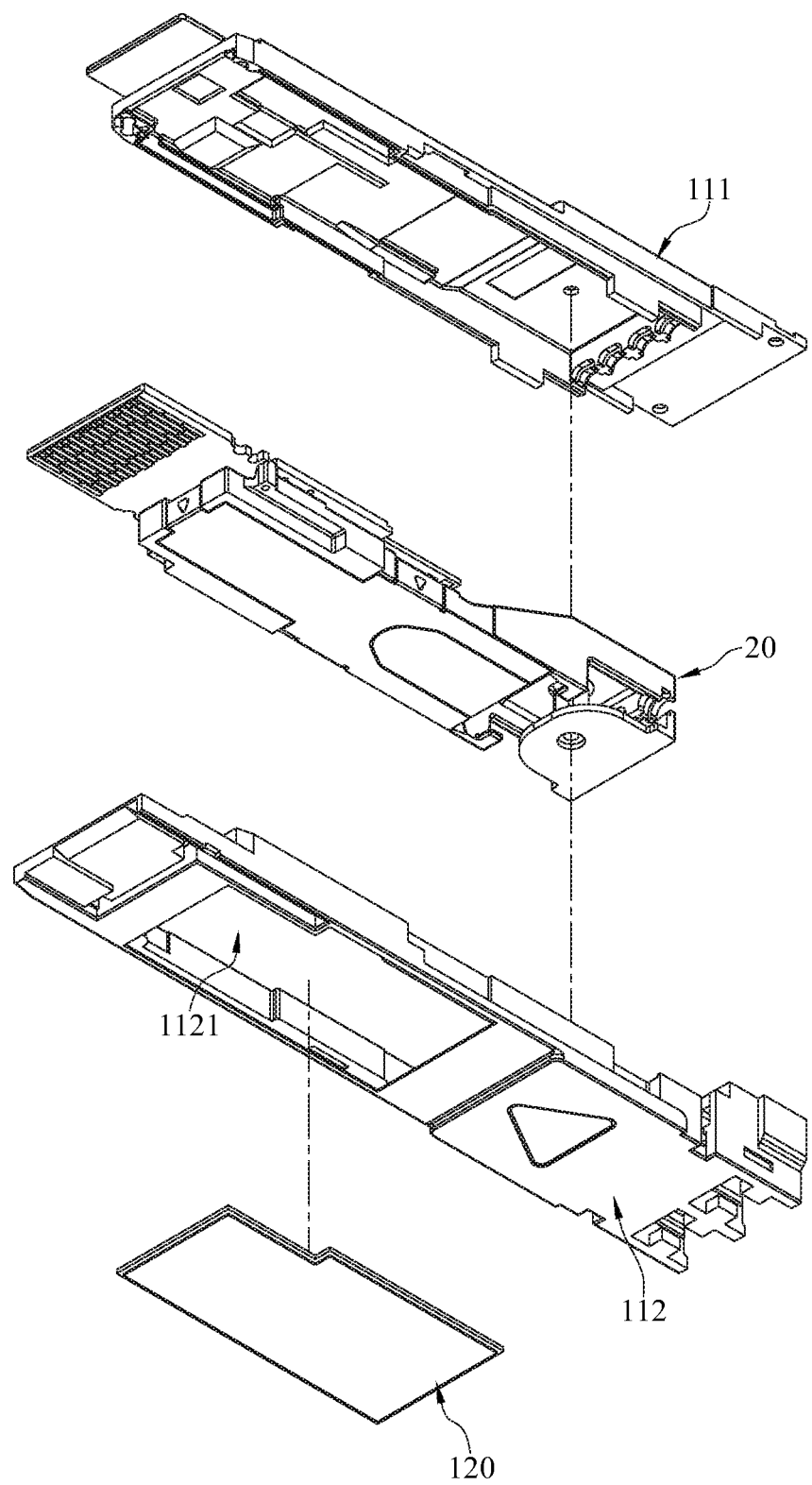
FIG. 2 is an exploded view of the optical transceiver in FIG. 1.
Figure 3:
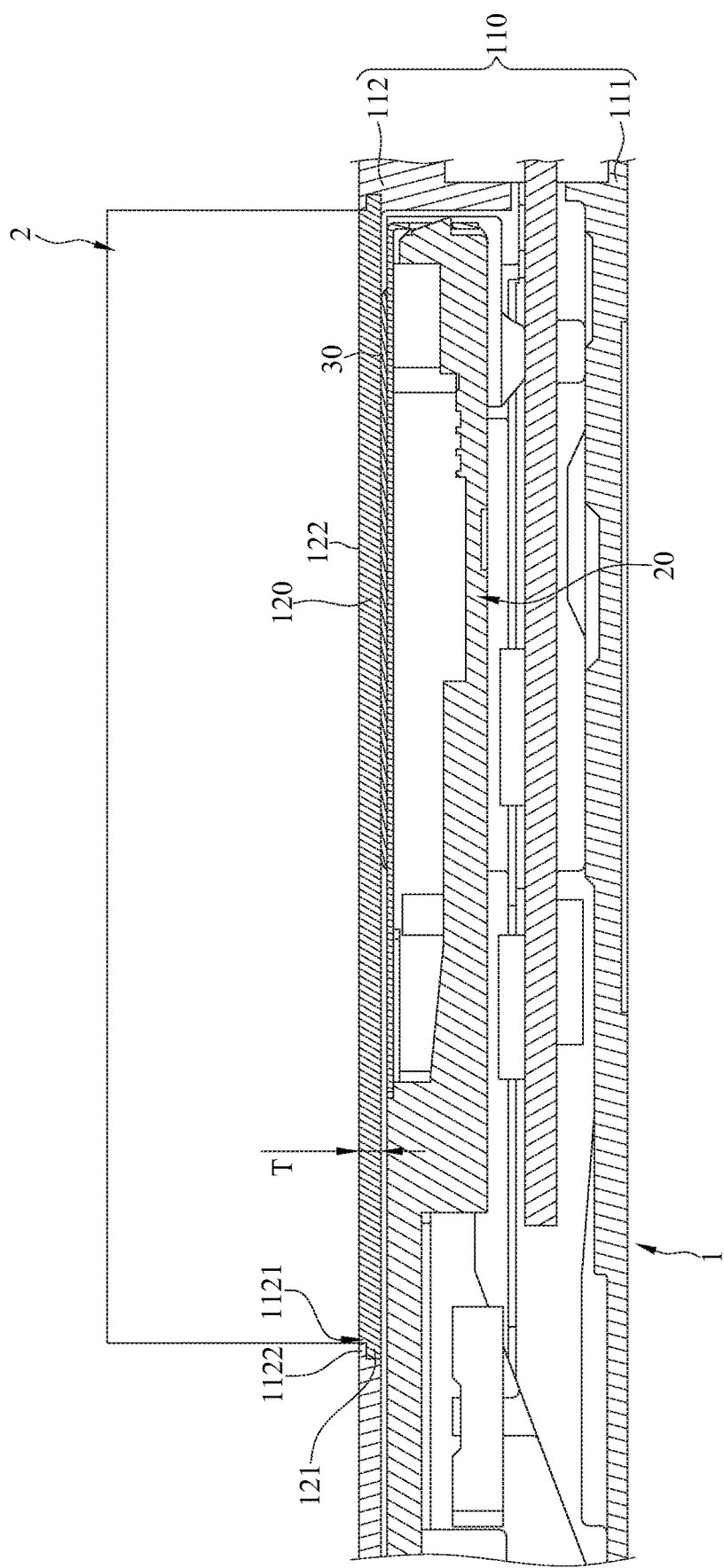
FIG. 3 is a cross-sectional view of the optical transceiver in FIG. 1.

Please refer to FIG. 1 to FIG. 3. FIG. 1 is a perspective view of an optical transceiver according to a first embodiment of the present disclosure. FIG. 2 is an exploded view of the optical transceiver in FIG. 1. FIG. 3 is a cross-sectional view of the optical transceiver in FIG. 1. In this embodiment, an optical transceiver 1 includes a housing 10, an optical transceiving module 20 and a graphite sheet 30.

The housing 10 includes a main body 110 and a heat conductive component 120. The main body 110 includes a first casing 111 and a second casing 112 assembled with each other. The first casing 111 is, for example, a top cover of the housing 10, and the second casing 112 is, for example, a bottom board of the housing 10. An opening 1121 of the second casing 112 is communicated with an accommodation space of the main body 110, and the main body 110 includes a first fastening structure 1122 located at a periphery of the opening 1121.

The heat conductive component 120 is, for example, a copper plate disposed in the opening 1121 of the second casing 112 of the main body 110. In detail, the heat conductive component 120 includes a second fastening structure 121 corresponding to the first fastening structure 1122. The heat conductive component 120 is disposed in the opening 1121 of the main body 110 with the first fastening structure 1122 fixed to the second fastening structure 121. The thermal conductivity of the heat conductive component 120 is larger than the thermal conductivity of the main body 110. In this embodiment, the heat conductive component 120 is made of copper and has a thermal conductivity of 400 W/m·K. The main body 110 is made of iron and has a thermal conductivity of 80 W/m·K. It is worth noting that the protective scope of the present disclosure is not limited to the material of the heat conductive component 120. The heat conductive component is made of a material selected from the group consisting of copper, aluminum, nickel and alloys thereof.

The optical transceiving module 20 is disposed on the second casing 112 and located in the main body 110. The optical transceiving module 20 includes a transmitter optical sub-assembly (TOSA), a receiver optical sub-assembly (ROSA), a driver IC Chip, a lens, a pigtail, and an arrayed waveguide gratings (AWG). It is worth nothing that the protective scope of the present disclosure is not limited to the elements of the optical transceiving module 20. In other words, depending on the technology adopted for the optical transceiving module 20, the elements thereof may vary from case to case.

The graphite sheet 30 is disposed in the main body 110. Two opposite sides of the graphite sheet 30 are attached to the arrayed waveguide gratings of the optical transceiving module 20 and the heat conductive component 120, respectively, such that the optical transceiving module 20 is in thermal contact with the heat conductive component 120. In this embodiment, the thermal contact between the optical transceiving module 20 and the heat conductive component 120 is accomplished by setting the graphite sheet 30. In some other embodiments, thermal grease is spread on the graphite sheet 30 to enable the thermal contact between the optical transceiving module 20 and the heat conductive component 120.

The heat conductive component 120 could help dissipate heat generated by the optical transceiving module 20 so as to cool down the optical transceiver 1. As shown in FIG. 3, the heat conductive component 120 is in thermal contact with a heat sink 2 located nearby the optical transceiver 1. The heat generated by the TOSA, the ROSA and the driver IC Chip of the optical transceiving module 20 is transferred to the heat conductive component 120 via the arrayed waveguide gratings and then transferred to the heat sink 2 via the heat conductive component 120. The thermal contact among the optical transceiving module 20, the heat conductive component 120 and the heat sink 2 could help transfer the heat generated by the optical transceiving module 20 to external environment via the heat conductive component 120 and the heat sink 2, thereby cooling down the optical transceiving module 20.

In this embodiment, the outer surface 122 of the heat conductive component 120 has an arithmetic mean roughness value (Ra) smaller than 0.4 millimeters (mm) and a flatness error smaller than 0.03 mm. The flatness error is a perpendicular deviation between the outer surface 122 of the heat conductive component 120 and an ideal outer surface of the heat conductive component 120. The heat conductive component 120, with smooth and flat outer surface, could establish better thermal contact between the heat conductive component 120 and the heat sink 2 so as to prevent higher heat resistance between the outer surface 122 and the heat sink 2 due to an air gap therebetween.

Furthermore, the thickness T of the heat conductive component 120 is equal to the thickness of the second casing 112 of the main body 110. Therefore, it could help prevent the space inside the main body 110 from being occupied by the heat conductive component 120 having overly large thickness T. Also, it could help prevent an air gap due to overly small thickness T of the heat conductive component 120, thereby meeting the requirement of efficient heat dissipation.

Figure 4:
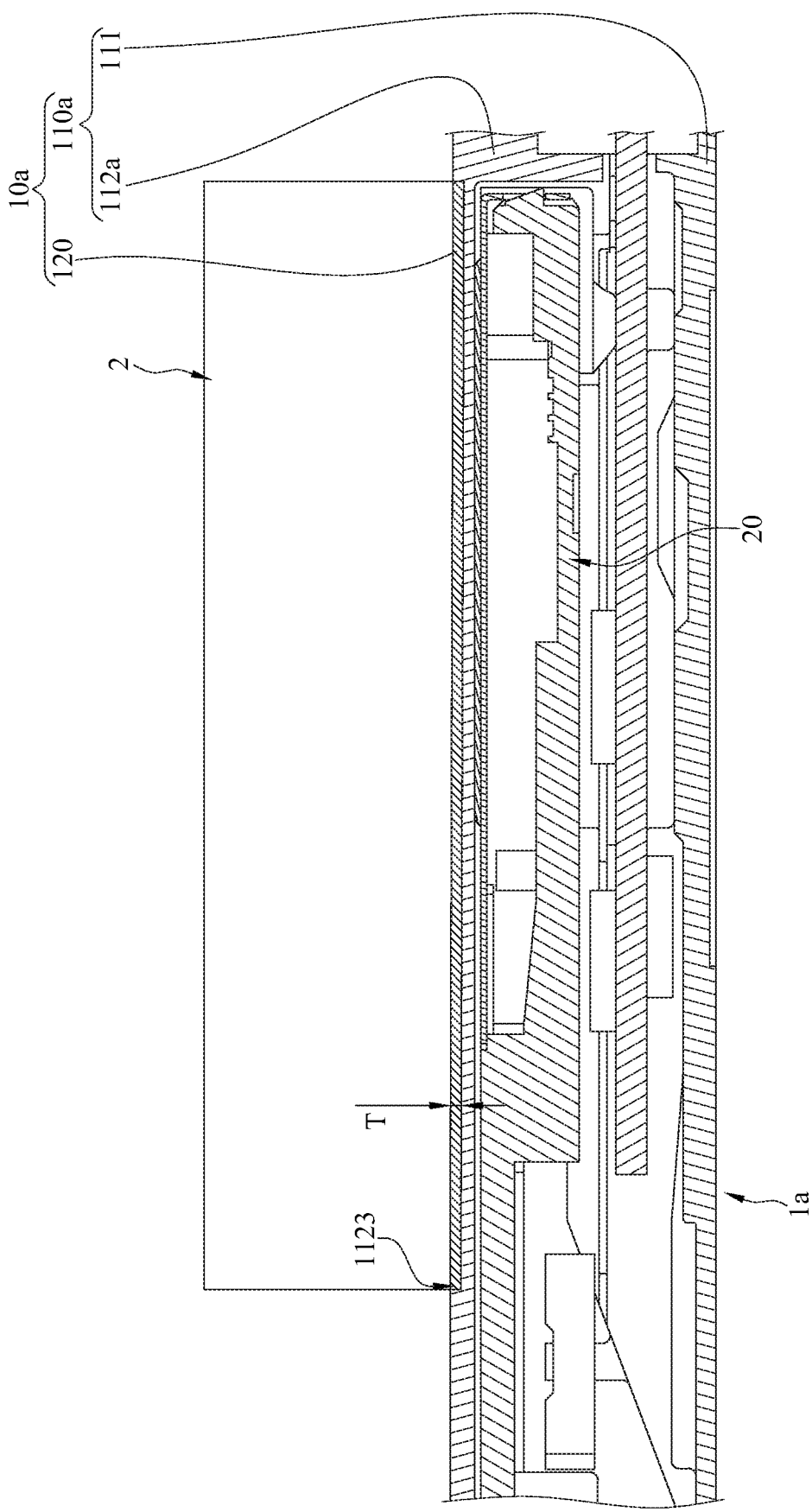
FIG. 4 is a cross-sectional view of an optical transceiver according to a second embodiment of the present disclosure.

In the first embodiment, the heat conductive component is disposed in the opening of the main body, and the thickness of the heat conductive component is equal to the thickness of the second casing of the main body, but the present disclosure is not limited by the above. FIG. 4 is a cross-sectional view of an optical transceiver according to a second embodiment of the present disclosure.

In this embodiment, an optical transceiver 1a includes a housing 10a, and the housing 10a includes a main body 110a and a heat conductive component 120. The main body 110a includes a first casing 111 and a second casing 112a assembled with each other. The outer surface of the second casing 112a has a recess 1123. The thickness T of the heat conductive component 120 is smaller than the thickness of the second casing 112a of the main body 110. The heat conductive component 120 is disposed in the recess 1123. The heat generated by the optical transceiving module 20 is transferred to the main body 110a via an arrayed waveguide gratings and then transferred to the heat sink 2 via the heat conductive component 120. Compared to the opening 1121 in the first embodiment, the recess 1123 could help prevent dust or other foreign objects entering into the main body 110a.

Figure 5:
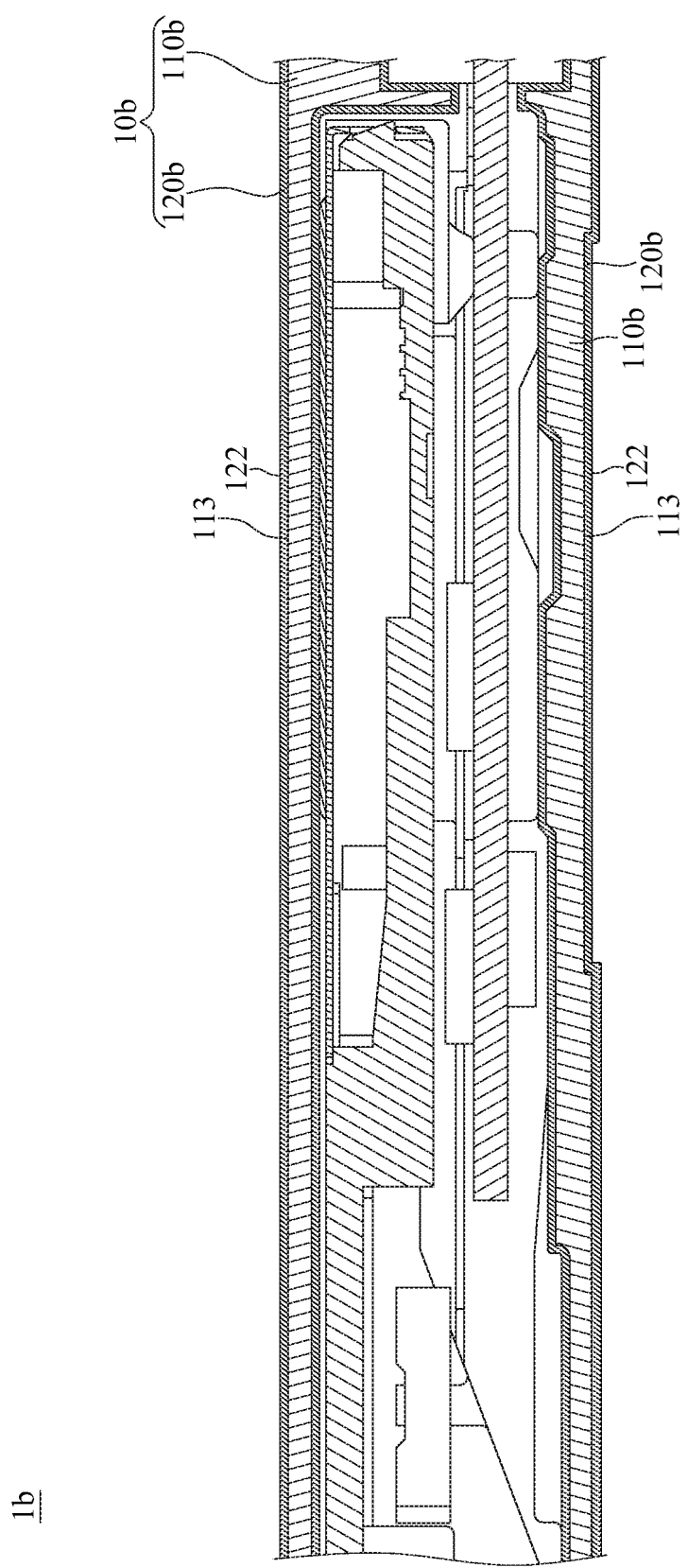
FIG. 5 is a cross-sectional view of an optical transceiver according to a third embodiment of the present disclosure.

The heat conductive component is a copper plate disposed on one side of the main body in the aforementioned two embodiments, but the present disclosure is not limited by the above. FIG. 5 is a cross-sectional view of an optical transceiver according to a third embodiment of the present disclosure.

In this embodiment, an optical transceiver 1b includes a housing 10b, and the housing 10b includes a main body 110b and a heat conductive component 120b. The heat conductive component 120b is a metal layer coated on the main body 110b by electroplating. The metal layer is, for example, a nickel layer having higher thermal conductivity than the main body 110b. It is worth noting that there are two heat conductive components 120b disposed on two sides of the main body 110b in this embodiment.

There are two methods of manufacturing the housing 10b of the optical transceiver 1b. One method includes two steps. Firstly, a part of the outer surface 113 of the main body 110b is polished such that the part of the outer surface 113 has an arithmetic mean roughness value smaller than 0.4 mm and a flatness error smaller than 0.03 mm. Next, an electroplating process is performed to coat the metal layer on the main body 110b. The flatness error mentioned in this paragraph is a perpendicular deviation between the outer surface 113 of the main body 110b and an ideal outer surface of the main body 110b.

Another method includes two steps. Firstly, an electroplating process is performed to coat the metal layer on the main body 110b. Next, a part of the outer surface 122 of the metal layer is polished such that the part of the outer surface 122 has an arithmetic mean roughness value smaller than 0.4 mm and a flatness error smaller than 0.03 mm. The flatness error mentioned in this paragraph is a perpendicular deviation between the outer surface 122 of the metal layer and an ideal outer surface of the metal layer.

According to the present disclosure, the housing of the optical transceiver includes a main body and a heat conductive component. The thermal conductivity of the heat conductive component is larger than the thermal conductivity of the main body. Therefore, the heat generated by the optical transceiving module is transferred to the heat conductive component and then transferred to the heat sink. The thermal contact among the optical transceiving module, the heat conductive component and the heat sink could help transfer the heat generated by the optical transceiving module to external environment via, thereby effectively cooling down the optical transceiving module. The optical transceiver operating with reduced working temperatures provides stable functionality and high safety.

The embodiments are chosen and described in order to best explain the principles of the present disclosure and its practical applications, to thereby enable others skilled in the art to best utilize the present disclosure and various embodiments with various modifications as are suited to the particular use being contemplated. It is intended that the scope of the present disclosure is defined by the following claims and their equivalents.

What is claimed is:

1. An optical transceiver, comprising:
   a housing comprising a main body and a heat conductive component, the heat conductive component defining an outer surface of the main body, and a thermal conductivity of the heat conductive component being larger than a thermal conductivity of the main body;
   an optical transceiving module disposed in an accommodation space of the main body of the housing; and
   wherein the main body of the housing comprises first and second casings to couple to each other and form the accommodation space of the main body therebetween, the heat conductive component being disposed on the second casing, and wherein the second casing and heat conductive component disposed thereon are configured to decouple from the optical transceiving module based on the first and second casings being decoupled from each other.

2. The optical transceiver according to claim 1, wherein the heat conductive component is disposed in an opening of the main body of the housing.

3. The optical transceiver according to claim 1, wherein an outer surface of the main body includes a recess, and the heat conductive component is disposed in the recess.

4. The optical transceiver according to claim 1, wherein the main body comprises a first fastening structure, the heat conductive component comprises a second fastening structure, and the heat conductive component is disposed on the main body with the first fastening structure fixed to the second fastening structure.

5. The optical transceiver according to claim 1, wherein a thickness of the heat conductive component is smaller than or equal to a thickness of the main body.

6. The optical transceiver according to claim 1, wherein the heat conductive component is made of a material selected from the group consisting of copper, aluminum, nickel and alloys thereof.

7. The optical transceiver according to claim 1, wherein an outer surface of the heat conductive component has an arithmetic mean roughness value smaller than 0.4 millimeters (mm) and a flatness error smaller than 0.03 mm.

8. The optical transceiver according to claim 1, wherein the heat conductive component is a metal layer coated on the main body by electroplating.

9. A housing of an optical transceiver, comprising a main body and a heat conductive component, the main body being configured to accommodate an optical transceiving module, the heat conductive component defining an outer surface of the main body, and a thermal conductivity of the heat conductive component being larger than a thermal conductivity of the main body, wherein the main body of the housing comprises first and second casings to couple to each other and accommodate the optical transceiving module therebetween, the heat conductive component being disposed on the second casing, and wherein the second casing and heat conductive component disposed thereon are configured to decouple from the optical transceiving module based on the first and second casings being decoupled from each other.

10. The housing according to claim 9, wherein the heat conductive component is disposed in an opening of the main body of the housing.

11. The housing according to claim 9, wherein an outer surface of the main body having a recess, and the heat conductive component is disposed in the recess.

12. The housing according to claim 9, wherein the main body comprises a first fastening structure, the heat conductive component comprises a second fastening structure, and the heat conductive component is disposed on the main body with the first fastening structure fixed to the second fastening structure.

13. The housing according to claim 9 wherein a thickness of the heat conductive component is smaller than or equal to a thickness of the main body.

14. The housing according to claim 9 wherein the heat conductive component is made of a material selected from the group consisting of copper, aluminum, nickel and alloys thereof.

15. The housing according to claim 9 wherein an outer surface of the heat conductive component has an arithmetic mean roughness value smaller than 0.4 mm and a flatness error smaller than 0.03 mm.

16. The housing according to claim 9 wherein the heat conductive component is a metal layer coated on the main body by electroplating.

17. The optical transceiver of claim 1, wherein the second casing includes an opening in communication with the accommodation space, and the heat conductive component is disposed in the opening of the second casing.

18. The optical transceiver of claim 1, wherein the main body of the housing includes a recess, the recess not being in communication with the accommodation space to limit entry of dust or other foreign objects entering the main body of the housing.

19. The optical transceiver of claim 18, wherein the heat conductive component is disposed in the recess.

20. The optical transceiver of claim 1, wherein the accommodation space of the main body is configured to receive the optical transceiver module, whereby the accommodation space holds the optical transceiver module in position relative to an optical coupling port defined by the main body.

* * * * *